United States Patent [19]
Summer, Jr.

[11] Patent Number: 5,613,729
[45] Date of Patent: Mar. 25, 1997

[54] VENTILATED SEAT COVER APPARATUS

[76] Inventor: Charlie B. Summer, Jr., 352 Halfacre Rd., Newberry, S.C. 29108

[21] Appl. No.: 589,190
[22] Filed: Jan. 22, 1996
[51] Int. Cl.$^6$ .................................................. A47C 7/74
[52] U.S. Cl. ............................... 297/180.11; 297/180.13; 297/180.14
[58] Field of Search .......................... 297/180.11, 180.13, 297/180.14

[56] References Cited

U.S. PATENT DOCUMENTS

| | | | |
|---|---|---|---|
| D. 267,523 | 1/1983 | Neilson . | |
| D. 343,326 | 1/1994 | Bruce . | |
| 2,912,832 | 11/1959 | Clark | 297/180.13 X |
| 3,030,145 | 4/1962 | Kottemann | 297/180.13 X |
| 4,413,857 | 11/1983 | Hayashi . | |
| 4,634,127 | 1/1987 | Rockwell | 297/118 X |
| 4,712,832 | 12/1987 | Antolini et al. | 297/180.11 |
| 4,946,220 | 8/1990 | Wyon et al. | 297/180.13 |
| 4,981,324 | 1/1991 | Law . | |
| 4,997,230 | 3/1991 | Spitalnick | 297/180 |
| 5,002,336 | 3/1991 | Feher | 297/180.13 |
| 5,071,192 | 12/1991 | Adler | 297/464 |
| 5,301,457 | 4/1994 | Seely | 297/180.14 X |
| 5,354,117 | 10/1994 | Danielson et al. | 297/180.11 X |
| 5,361,450 | 11/1994 | Shofner et al. | 19/66 R |
| 5,370,439 | 12/1994 | Lowe et al. . | |
| 5,372,402 | 12/1994 | Kuo | 297/180.11 X |
| 5,403,065 | 4/1995 | Callerio | 297/180.11 |
| 5,490,704 | 2/1996 | Calnan | 296/24.1 |

*Primary Examiner*—Peter M. Cuomo
*Assistant Examiner*—Stephen Vu

[57] ABSTRACT

A ventilated seat cover apparatus includes an understructure assembly which includes a pair of side pipe assemblies and a plurality of transverse pipes connected between the side pipe assemblies. The transverse pipes include plural air-venting apertures, and the side pipe assemblies include end portions which have removable and replaceable pipe plugs. A porous understructure-cover sheet covers the understructure assembly, and a flexible hose is connected to the understructure assembly. Cushion units are placed between neighboring transverse pipes. The understructure assembly may include a seat portion and a back portion connected to the seat portion by a pair of flexible interconnector hoses. Straps are used to connect the seat portion and the back portion to a seat and a seat back, respectively. The side pipe assemblies include sequential arrays of T-shaped members alternating with straight members. The transverse pipes are connected to perpendicular portions of opposing T-shaped members in opposing side pipe assemblies. A DC battery-powered dedicated blower assembly is connected to the flexible hose for use on a vehicle seat. The blower assembly includes an air filter for filtering air drawn in by the blower assembly. Alternatively, a vent adaptor is connected to the flexible hose for connecting the flexible hose to a source of ventilation which has an already in-use blower motor and an already in-use vent. A Y-shaped connector may be used to connect one blower to two seat portions.

9 Claims, 3 Drawing Sheets

VENTILATED SEAT COVER APPARATUS

BACKGROUND OF THE INVENTION

1. Field of the Invention

The present invention relates generally to covers for seats and, more particularly, to ventilated seat covers.

2. Description of the Prior Art

When a person sits in a seat, there is often a build up of perspiration on portions of the person that are most close to the seat. This is especially true in hot summer months. It is also especially true in vehicles, and most especially vechicles that are not air conditioned, such as construction vehicles and tractors. In such vehicles, the build up of perspiration may be in such great quantity that the clothing of the vehicle operator becomes wet. To reduce perspiration build up in such conditions, throughout the years, a number of innovations have been developed relating to seat ventilation, and the following U.S. patents are representative of some of those innovations: U.S. Pat. No. 4,413,857, U.S. Pat. No. 4,981,324, U.S. Pat. No. 4,997,230, U.S. Pat. No. 5,370,439, U.S. Pat. No. Design 267,523, and U.S. Pat. No. Design 343,326. More specifically, the devices disclosed in each of U.S. Pat. Nos. 4,413,857, 4,981,324, 4,997,230, and 5,370,439 vary from one another in numerous ways. However, those devices have a number of common characteristics as well. For example, each of those devices connects to a source of forced air to provide forced-air ventilation. Moreover, each of those devices has only one location for connecting to a source of forced air. As a result, if the flexible air hose that runs between a source of forced air and the seat is connected to the seat in an inconvenient location, the hose may get in person's way, and avoiding such inconvenience does not seem to be contemplated. To avoid the problem of an inconveniently located air hose connection, it would be desirable if a ventilated seat cover device included a number of optional connection sites for an air hose.

Each of the devices in U.S. Pat. Nos. 4,413,857, 4,981,324, 4,997,230, and 5,370,439 share another common characteristic. With each device, a seat portion and a back portion are permanently connected to each other. There are some vehicles, however, which have seats but do not have back portions to the seats. For such vehicles, it would be desirable if a ventilated seat cover device did not include a back portion.

As a matter of interest, each of U.S. Pat. No. Design 267,523, and U.S. Pat. No. Design 343,326 discloses a passive seat cover that does not include a source of forced air.

Still other features would be desirable in a ventilated seat cover device. For example, for ventilated seat covers that are employed outdoors, often dusty conditions are prevalent. To prevent dust from entering the ventilated seat cover, it would be desirable if a source of forced air had an intake air filter. In addition, electrical power in motor vehicles is usually based on a DC battery. In this respect, it would be desirable if a ventilated seat cover employs a DC battery for powering a blower. Some motor vehicles, especially vehicles that have enclosed cabs, often have air conditioning systems that have a forced air blower. In this respect, it would be desirable if a ventilated seat cover had a option of deriving forced air from a blower in an in-place air conditioning system.

There may be times when it is desirable to use a ventilated seat cover. On the other hand, there :may be other times when it is not desirable to use a ventilated seat cover. In this respect, it would be desirable if a ventilated seat cover were provided that is easily put on or removed from a vehicle seat.

In a passenger vehicle, there are often two persons seated on front seats, a driver and a passenger. To avoid the need for two blowers to ventilate two seats, it would be desirable if an adaptor were provided that enables two ventilated seat covers to be ventilated by one blower.

Thus, while the foregoing body of prior art indicates it to be well known to use ventilated seat covers, the prior art described above does not teach or suggest a ventilated seat cover apparatus which has the following combination of desirable features: (1) includes a number of optional connection sites for an air hose; (2) optionally, may or may not include a back portion; (3) has an intake-air filter; (4) employs a DC battery for powering a blower; (5) has an option of deriving forced air from a dedicated blower a blower in an in-place air conditioning system; (6) is easily attached to or removed from a vehicle seat; and (7)enables two ventilated seat covers to be ventilated by one blower. The foregoing desired characteristics are provided by the unique ventilated seat cover apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a ventilated seat cover apparatus which includes an understructure assembly which includes a pair of side pipe assemblies and a plurality of transverse pipes connected between the side pipe assemblies. The transverse pipes includes plural air-venting apertures, and the side pipe assemblies include end portions which have removable and replaceable pipe plugs. A porous understructure-cover sheet is supported by the understructure assembly, and a flexible hose is connected to the understructure assembly. Cushion units are placed between neighboring transverse pipes.

The understructure assembly includes a seat portion. The understructure assembly may further include a back portion connected to the seat portion. A pair of flexible interconnector hoses are employed for connecting the back portion to the seat portion. A seat strap assembly is used for connecting the seat portion to a seat. The seat strap assembly includes complementary hook and loop fasteners. A back strap assembly is used for connecting the back portion to a seat back. The back strap assembly includes complementary hook and loop fasteners.

The side pipe assemblies include a sequential array of T-shaped members alternating with straight members. The transverse pipes are connected to perpendicular portions of opposing T-shaped members in opposing side pipe assemblies. The T-shaped members, which are located at end portions of the side pipe assemblies, include pipe plugs. A dedicated blower assembly is connected to the flexible hose. The blower assembly includes an air filter for filtering air drawn in by the blower assembly. The blower assembly is powered by a DC battery.

In accordance with another embodiment of the invention, a vent adaptor is connected to the flexible hose for connecting the flexible hose to a source of ventilation has an already in-use blower motor and an already in-use vent. A Y-shaped connector may be connected to two flexible hoses which are connected to two understructure assemblies for enabling one source of forced air to supply air to the two understructure assemblies.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved ventilated seat cover apparatus which has all of the advantages of the prior art and none of the disadvantages.

It is another object of the present invention to provide a new and improved ventilated seat cover apparatus which may be easily and efficiently manufactured and marketed.

It is a further object of the present invention to provide a new and improved ventilated seat cover apparatus which is of durable and reliable construction.

An even further object of the present invention is to provide a new and improved ventilated seat cover apparatus which is susceptible of a low cost of manufacture with regard to both materials and labor, and which accordingly is then susceptible of low prices of sale to the consuming public, thereby making such ventilated seat cover apparatus available to the buying public.

Still yet a further object of the present invention is to provide a new and improved ventilated seat cover apparatus which includes a number of optional connection sites for an air hose.

Still another object of the present invention is to provide a new and improved ventilated seat cover apparatus that optionally, may or may not include a back portion.

Yet another object of the present invention is to provide a new and improved ventilated seat cover apparatus which has an intake-air filter.

Even another object of the present invention is to provide a new and improved ventilated seat cover apparatus that employs a DC battery for powering a blower.

Still a further object of the present invention is to provide a new and improved ventilated seat cover apparatus which has an option of deriving forced air from a dedicated blower a blower in an in-place air conditioning system.

Yet another object of the present invention is to provide a new and improved ventilated seat cover apparatus that is easily attached to or removed from a vehicle seat.

Still another object of the present invention is to provide a new and improved ventilated seat cover apparatus which enables two ventilated seat covers to be ventilated by one blower.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

Figure 1:
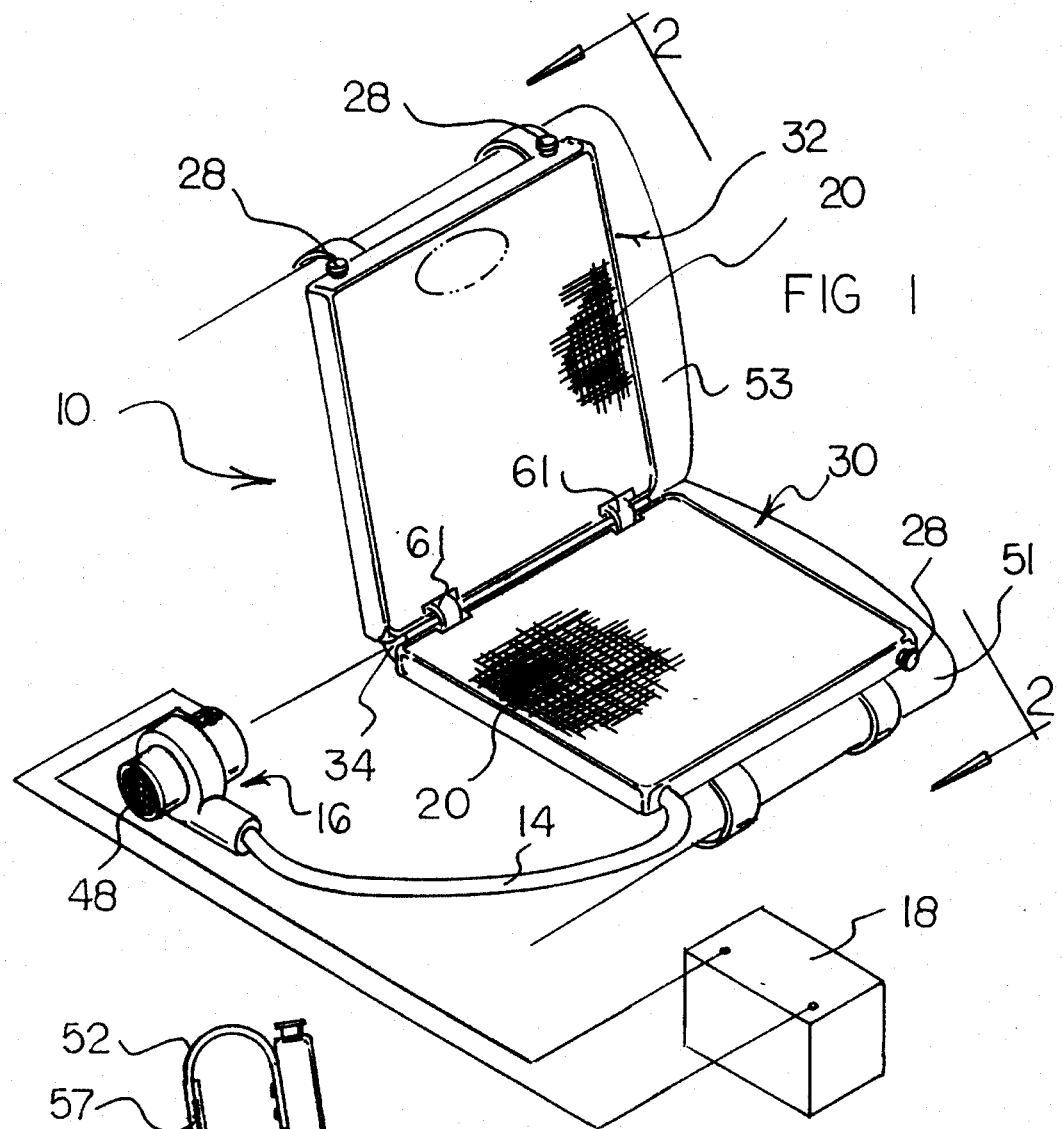
FIG. 1 a perspective view showing a first embodiment of the ventilated seat cover apparatus of the invention which is installed on a vehicle seat and which employs a dedicated blower.
Figure 2:
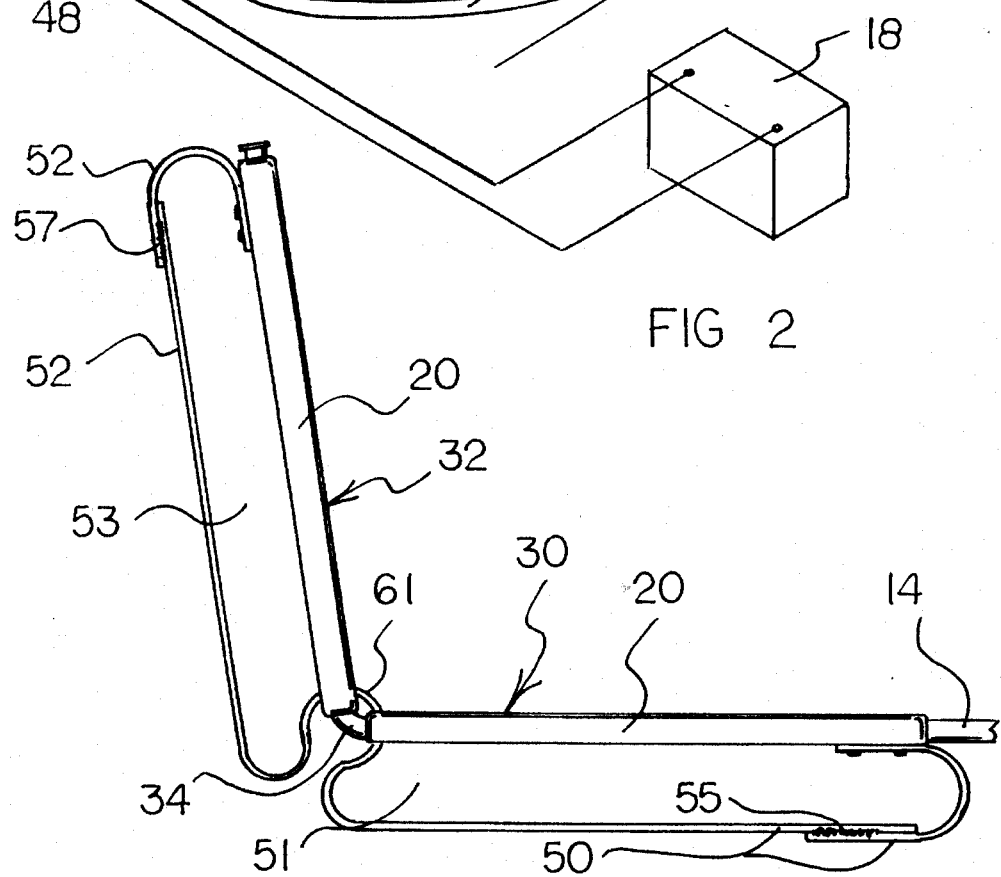
FIG. 2 is an enlarged side view of the embodiment of the invention shown in FIG. 1 taken along line 2—2 in FIG. 1 and removed from the vehicle seat.

With reference to the drawings, a new and improved ventilated seat cover apparatus embodying the principles and concepts of the present invention will be described.

Turning to FIGS. 1–4, a first embodiment of the ventilated seat cover apparatus of the invention is shown and is generally designated by reference numeral 10. More specifically, a ventilated seat cover apparatus 10 which includes an understructure assembly 12 which includes a pair of side pipe assemblies 22 and a plurality of transverse pipes 24 connected between the side pipe assemblies 22. The transverse pipes 24 includes plural air-venting apertures 26, and the side pipe assemblies 22 include end portions 27 which have removable and replaceable pipe plugs 28. A porous understructure-cover sheet 20 is supported by the understructure assembly 12, and a flexible hose 14 is connected to the understructure assembly 12. The understructure-cover sheet 20 can be a porous fabric that completely envelopes the understructure assembly 12. Cushion units 44 are placed between neighboring transverse pipes 24. The cushion units 44 can be secured to the transverse pipes 24 using adhesive materials. The cushion units 44 can be made from plastic foam, rubber foam, or other suitable cushion-forming materials.

The understructure assembly 12 includes a seat portion 30. The understructure assembly 12 may further include a back portion 32 connected to the seat portion 30. Straps 61 can be used to connect the seat portion 30 to the back portion 32. A pair of flexible interconnector hoses 34 are employed for connecting the back portion 32 to the seat portion 30. A seat strap assembly 50 is used for connecting the seat portion 30 to a seat 51. The seat strap assembly 50 includes complementary hook and loop fasteners 55. A back strap assembly 52 is used for connecting the back portion 32 to a seat back 53. The back strap assembly 52 includes complementary hook and loop fasteners 57.

Figure 3:
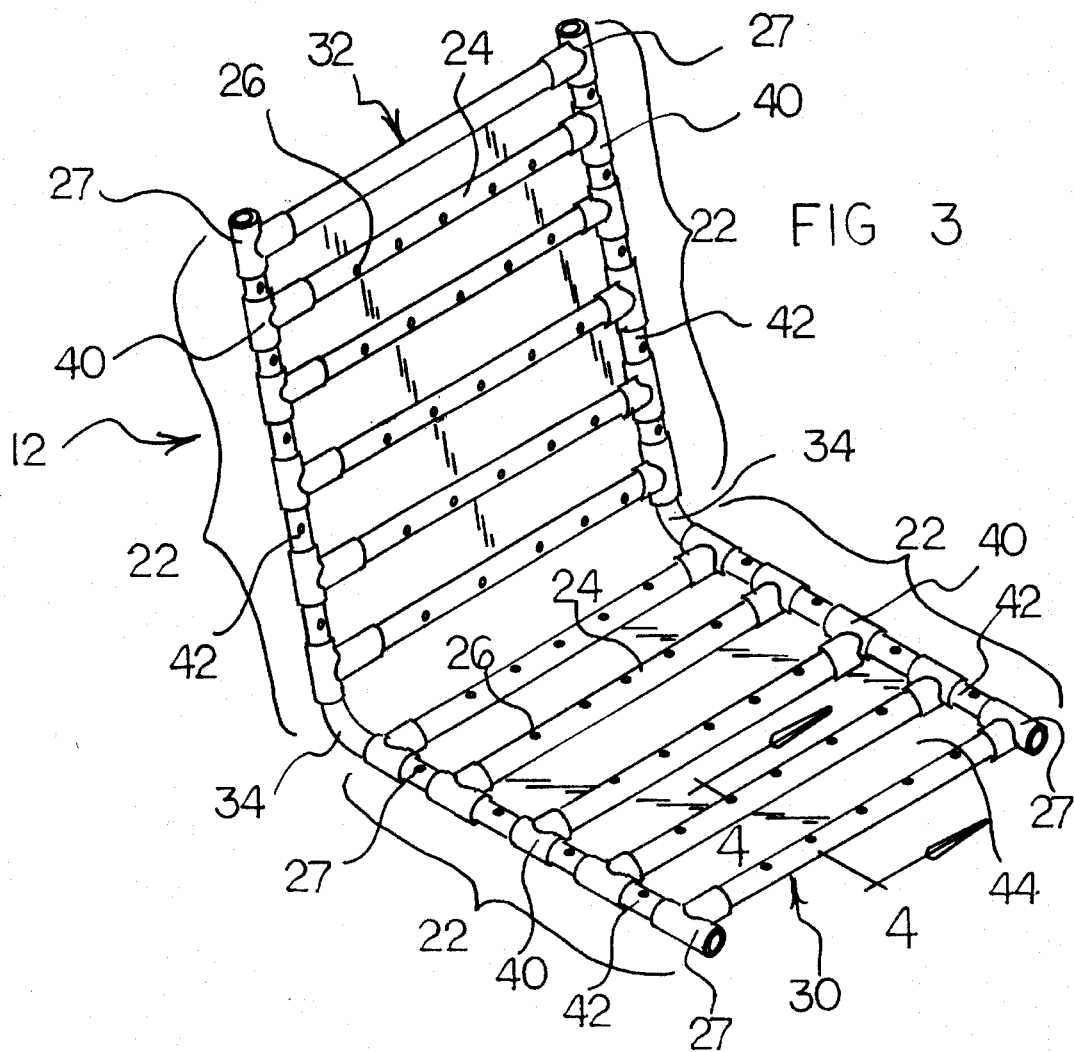
FIG. 3 is a top perspective view of the embodiment of the invention shown in FIG. 2 with a surface covering removed to illustrate the understructure.
Figure 4:
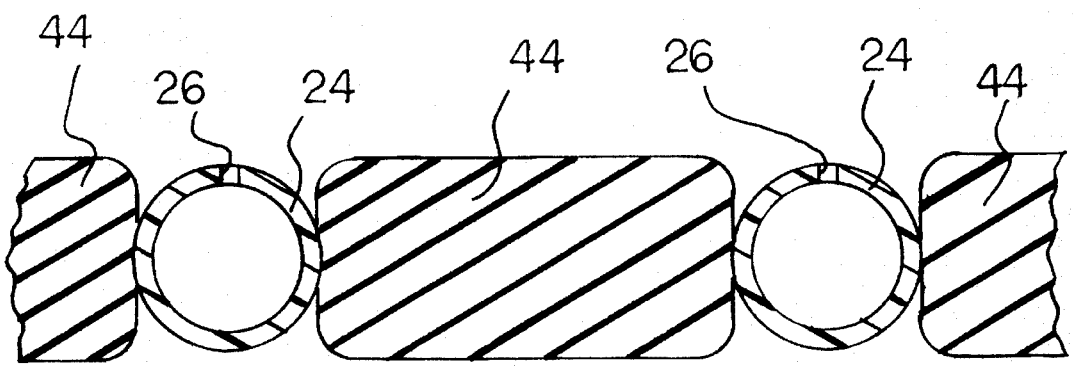
FIG. 4 is an enlarged partial cross-sectional view of the embodiment of the invention shown in FIG. 3 taken along line 4—4 of FIG. 3.

As shown most clearly in FIG. 3, the side pipe assemblies 22 include a sequential array of T-shaped members 40 alternating with straight members 42. The transverse pipes 24 are connected to perpendicular portions 41 of opposing T-shaped members 40 in opposing side pipe assemblies 22. The straight members 42 can also include air-venting apertures 26. The T-shaped members 40, which are located at end portions 27 of the side pipe assemblies 22, include pipe plugs 28. The T-shaped members 40, the straight members 42, and the transverse pipes 24 are all made from rigid plastic tubing dedicated blower assembly 16 is connected to the flexible hose 14. The blower assembly 16 includes an air filter 48 for filtering air drawn in by the blower assembly 16. For use in a motor vehicle, The blower assembly 16 is powered by a DC battery 18.

In using the first embodiment of the ventilated seat cover apparatus 10 of the invention, a separate blower assembly 16 is provided that is powered by the battery 18 of a motor vehicle. If only the seat portion 30 of the ventilated seat cover apparatus 10 is employed, then pipe plugs 28 are placed in all of the end portions 27 of the side pipe assemblies 22 except for one end portion 27 onto which the flexible hose 14 is connected. The blower assembly 16 provides air through the flexible hose 14 to the side pipe assemblies 22 and the transverse pipes 24 of the understructure assembly 12 and out of the air-venting apertures 26 and through the understructure-cover sheet 20 onto a person seated on the understructure-cover sheet 20. It is noted that the flexible hose 14 can be connected to either of the end portions 27 of the side pipe assemblies 22. Whichever end portion 27 is used for connection to the flexible hose 14, the other end portion 27 is plugged up with a pipe plug 28. The seat strap assembly 50 is used for attaching the seat portion 30 to a seat 51. The seat 51 can be a seat in a motor vehicle. Alternatively, the seat 51 can be a seat in a building structure. Hook and loop fasteners 55, e.g. VELCRO(™) fasteners, can be used to secure the seat strap assembly 50 to the seat portion 30.

When a back portion 32 is added to the seat portion 30, flexible interconnector hoses 34 are used to connect end portions 27 of the side pipe assemblies 22 of the seat portion 30 to end portions 27 of the side pipe assemblies 22 of the back portion 32. Pipe plugs 28 are placed in all end portions 27 that are not connected to either a flexible hose 14 or an interconnector hose 34. Because of the selectable use of pipe plugs 28, the flexible hose 14 can be selectively connected to any of the end portions 27 of the side pipe assemblies 22 that are not connected to interconnector hoses 34. The back strap assembly 52 is used for attaching the back portion 32 to the seat back 53. The seat back 53 can be the seat back of a motor vehicle. Alternatively, the seat back can be in a building structure. The hook and loop fasteners 57 are used to secure the back strap assembly 52 to the seat back 53. The hook and loop fasteners 57 can be made from VELCRO(™) materials. When the ventilated seat cover apparatus 10 of the invention is used in a building structure, the blower assembly 16 is powered by 110 VAC.

Figure 5:
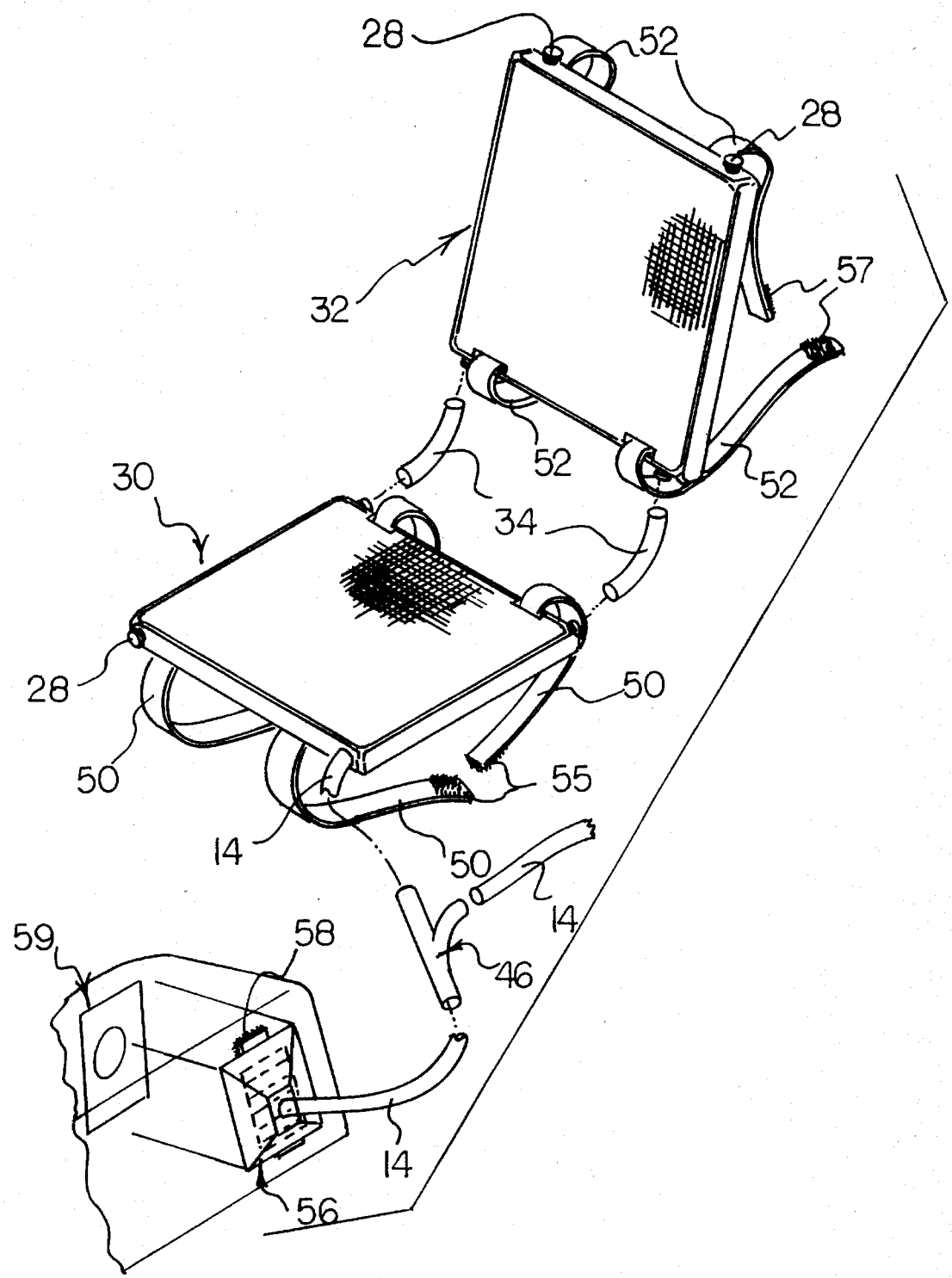
FIG. 5 is an exploded perspective view of a second embodiment of the invention which employs an in-use vehicle ventilation system as a source of forced air.

Turning to FIG. 5, a second embodiment of the invention is shown. Reference numerals are shown that correspond to like reference numerals that designate like elements shown in the other figures. In addition, vent adaptor 56 is connected to the flexible hose 14 for connecting the flexible hose 14 to a source of ventilation has an already in-use blower motor 59 and an already in-use vent 58.

A Y-shaped connector 46 is connected to two flexible hoses 14 which are connected to two understructure assemblies 12 for enabling one source of forced air to supply air to the two understructure assemblies 12. It is noted that the Y-shaped connector 46 can also be used with the first embodiment of the invention which employs a dedicated blower assembly 16.

The components of the ventilated seat cover apparatus of the invention can be made from inexpensive and durable plastic materials. If desired, metal materials can also be employed.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a :new and improved ventilated seat cover apparatus that is low in cost, relatively simple in design and operation, and which may advantageously be used to provide a number of optional connection sites for an air hose. With the invention, a ventilated seat cover apparatus is provided which optionally, may or may not include a back portion. With the invention, a ventilated seat cover apparatus is provided which has an intake-air filter. With the invention, a ventilated seat cover apparatus is provided which employs a DC battery for powering a blower. With the invention, a ventilated seat cover apparatus is provided which has an option of deriving forced air from a dedicated blower a blower in an in-place air conditioning system. With the invention, a ventilated seat cover apparatus is provided which is easily attached to or removed from a vehicle seat. With the invention, a ventilated seat cover apparatus is provided which enables two ventilated seat covers to be ventilated by one blower.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by LETTERS PATENT of the United States is as follows:

1. A ventilated seat cover apparatus, comprising:

an understructure assembly which includes a pair of side pipe assemblies and a plurality of transverse pipes connected between said side pipe assemblies, wherein said transverse pipes include plural air-venting apertures, and wherein said side pipe assemblies include end portions having removable and replaceable pipe plugs, a porous understructure-cover sheet supported by said understructure assembly, wherein said understructure assembly includes a seat portion, wherein said understructure assembly further includes a back portion connected to said seat portion, further including:

a pair of flexible interconnector hoses for connecting said back portion to said seat portion, each of said pair of flexible interconnector hoses being connected to adjacent end portions of said side pipe assemblies on said back portion and said seat portion, respectively, and wherein at least one of said end portions on said side pipe assemblies remotely situated from said flexible interconnector hoses on either a top edge of said back portion or on a front edge of said seat portion has corresponding said pipe plug removed such that at least one said end portion is adapted to be connected to a source of pressurized ventilating medium and wherein the remaining end portions on said side pipe assemblies are closed by said removable pipe plugs.

2. The apparatus of claim 1, further including:

cushion units placed between said neighboring transverse pipes.

3. The apparatus of claim 1, further including:

a back strap assembly for said back portion, wherein said back strap assembly includes complementary hook and loop fasteners, further including:

a seat strap assembly for said seat portion, wherein said seat strap assembly includes complementary hook and loop fasteners, and wherein said back strap assembly and said seat strap assembly each comprises first and second strap portions, the first strap portion of said back strap assembly being connected to said back portion proximal to said top edge thereof, the first strap portion of said seat strap assembly being connected to said seat portion proximal to said front edge thereof, and said second portion of said back strap assembly being connected to said second portion of said seat strap assembly.

4. The apparatus of claim 3 wherein said back portion includes at least one through passage proximal to the bottom edge thereof and said seat portion includes at least one through passage proximal to said rear edge thereof wherein said connected second portions of said back strap assembly and said seat strap assembly form a unitary strap portion extending through both of said at least one through passages in said back portion and said seat portion, respectively.

5. The apparatus of claim 1 wherein said side pipe assemblies include:

a sequential array of T-shaped members alternating with straight members, each of said T-shaped members having a transverse pipe and a portion perpendicular to said transverse pipe, wherein said transverse pipes are connected to said perpendicular portions of opposing said T-shaped members in opposing said side pipe assemblies.

6. The apparatus of claim 5 wherein said T-shaped members which are located at said end portions of said side pipe assemblies include pipe plugs.

7. The apparatus of claim 1, further including:

a blower assembly connected to said flexible hose, said blower assembly comprising said source of pressurized ventilating medium.

8. The apparatus of claim 7 wherein said blower assembly includes an air filter for filtering air drawn in by said blower assembly.

9. The apparatus of claim 7 wherein said blower assembly is powered by a DC battery.

\* \* \* \* \*